(12) United States Patent
Nakamura et al.

(10) Patent No.: US 10,954,142 B2
(45) Date of Patent: *Mar. 23, 2021

(54) WATER CLEANING AGENT AND WATER CLEANING METHOD

(71) Applicant: Dexerials Corporation, Tokyo (JP)

(72) Inventors: Masayuki Nakamura, Tokyo (JP); Ryu Shimada, Tokyo (JP); Takanori Fujita, Tokyo (JP); Kazuhiro Kimura, Tokyo (JP); Masato Hasegawa, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 15/562,577

(22) PCT Filed: Mar. 8, 2016

(86) PCT No.: PCT/JP2016/057241
§ 371 (c)(1),
(2) Date: Sep. 28, 2017

(87) PCT Pub. No.: WO2016/158256
PCT Pub. Date: Oct. 6, 2016

(65) Prior Publication Data
US 2018/0111857 A1    Apr. 26, 2018

(30) Foreign Application Priority Data

Mar. 30, 2015  (JP) .............................. JP2015-069281

(51) Int. Cl.
*C02F 1/52* (2006.01)
*B01D 21/01* (2006.01)
(Continued)

(52) U.S. Cl.
CPC ............ *C02F 1/5272* (2013.01); *B01D 21/01* (2013.01); *C02F 1/5263* (2013.01); *C02F 1/56* (2013.01);
(Continued)

(58) Field of Classification Search
None
See application file for complete search history.

(56) References Cited

U.S. PATENT DOCUMENTS

2003/0159987 A1    8/2003  Jensen
2005/0161407 A1    7/2005  McPhillips
(Continued)

FOREIGN PATENT DOCUMENTS

CN    102198407    9/2011
CN    102247814    11/2011
(Continued)

OTHER PUBLICATIONS

Shimada, et al., News of Flowers from Standing Director, Atomi University Nosanfu [online], 2010.
(Continued)

*Primary Examiner* — Clare M Perrin
(74) *Attorney, Agent, or Firm* — Carmody Torrance Sandak & Hennessey LLP

(57) ABSTRACT

Provided is a water-purifying agent that is excellent in water purifying performance, can be suitably used in an automated wastewater purification apparatus, and is formed of a granulated product including a mixture of a powder of *Corchorus olitorius* and a polymeric flocculant, wherein a median diameter of the granulated product is 250 micrometers or greater but 850 micrometers or less.

5 Claims, 1 Drawing Sheet

"Intermediate jute No. 3": identification number  皖品鉴登字第１２０９００６

"Intermediate kenaf": identification number  皖品鉴登字第１２０９００１

(51) Int. Cl.
*C02F 1/56* (2006.01)
*C02F 101/10* (2006.01)
*C02F 101/14* (2006.01)
*C02F 101/20* (2006.01)
*C02F 101/22* (2006.01)

(52) U.S. Cl.
CPC .... *C02F 2101/103* (2013.01); *C02F 2101/14* (2013.01); *C02F 2101/20* (2013.01); *C02F 2101/203* (2013.01); *C02F 2101/22* (2013.01)

(56) References Cited

U.S. PATENT DOCUMENTS

| | | | |
|---|---|---|---|
| 2009/0272693 A1 | 11/2009 | Mabille et al. | |
| 2011/0094968 A1 | 4/2011 | Spittle et al. | |
| 2013/0299433 A1* | 11/2013 | Inagaki | C02F 1/5263 210/730 |

FOREIGN PATENT DOCUMENTS

| | | |
|---|---|---|
| CN | 103508533 | 1/2014 |
| GB | 1370446 | 10/1974 |
| JP | S49-083681 | 8/1974 |
| JP | S52-002877 | 1/1977 |
| JP | H07308527 | 11/1995 |
| JP | H09117776 | 5/1997 |
| JP | 11114314 | 4/1999 |
| JP | H11-114313 | 4/1999 |
| JP | 2004-000923 | 1/2004 |
| JP | 2011-194384 | 10/2011 |
| JP | 2011-194385 | 10/2011 |
| JP | 2013078717 | 5/2013 |
| JP | 2014-008428 | 1/2014 |
| JP | 2014505588 | 3/2014 |
| RU | 2241730 | 12/2004 |
| RU | 2293069 | 6/2005 |
| TW | 201139288 | 11/2011 |
| TW | 201228946 | 7/2012 |
| UA | 47749 | 2/2010 |
| WO | 0107750 | 2/2001 |
| WO | 2010131492 | 11/2010 |
| WO | 2013090569 | 6/2013 |
| WO | WO-2013090569 A2 * | 6/2013 ............ C02F 9/00 |

OTHER PUBLICATIONS

The Patent Office of the People's Republic of China, First Office Action in corresponding Chinese Application No. 201680019448.5, dated Jan. 21, 2019.
Federal Service for Intellectual Property, Decision to Grant in Russian Application No. 2017134280/05 (060433), dated Apr. 26, 2019.
European Patent Office, Extended Search Report issued in European Application No. 16768268.1, dated Oct. 2, 2018.
European Patent Office, Extended Search Report issued in European Application No. 16772316.2, dated Oct. 1, 2018.
The Patent Office of the People's Republic of China, First Office Action in Chinese Application No. 201680018554.1, dated Jan. 18, 2019.
The Patent Office of the People's Republic of China, Second Office Action in Chinese Application No. 201680010554.1, dated Jul. 19, 2019.
General Directorate of Intellectual Property, Office Action issued in Indonesian Application No. P00201707443, dated Jul. 15, 2019.
The Patent Office of the People's Republic of China, Second Office Action issued in Chinese Application No. 201680019448.5, dated Jul. 19, 2019.
Taiwanese Patent Office, Office Action issued in Taiwanese Application No. 105108400, dated Aug. 12, 2019.
Taiwanese Patent Office, Office Action issued in Taiwanese Application No. 105108800, dated Aug. 23, 2019.
Taiwanese Patent Office, Office Action issued in Taiwanese Application No. 105106180, dated Jul. 12, 2019.
European Patent Office, European Official Communication issued in EP16768268.1, dated Oct. 31, 2019.
Indian Patent Office, Examination Report issued in corresponding Indian Application No. 201737036029, dated Nov. 29, 2019.

* cited by examiner

"Intermediate jute No. 3": identification number 皖品鉴登字第１２０９００６

"Intermediate kenaf": identification number 皖品鉴登字第１２０９００１

WATER CLEANING AGENT AND WATER CLEANING METHOD

TECHNICAL FIELD

The present invention relates to a plant-derived water-purifying agent used for purification of water such as industrial wastewater and a water purification method using the water-purifying agent.

BACKGROUND ART

In recent years, a large amount of waste liquids including environmentally hazardous substances such as metal ions and fluorine ions as inorganic ions have been generated in the processes for producing various products in plants.

Meanwhile, regulations on effluence of such inorganic ions have been becoming gradually strict. In order to comply with the effluent control, an inorganic ion removing method that can effectively remove inorganic ions from wastewater including the inorganic ions and can be carried out as easily and inexpensively as possible is demanded.

Hitherto, as the method for removing impurity ions from, for example, wastewater from plants, for example, a flocculating precipitation method, an ion-exchange method, a method for adsorption to an adsorbent such as activated charcoal, an electrosorption method, and a magnetic adsorption method have been proposed.

For example, as the flocculating precipitation method, there has been proposed a method of performing a step of adding a base to wastewater in which heavy metal ions are dissolved, to make the wastewater basic, insolubilize at least part of the heavy metal ions, and form a suspended solid matter, a step of adding an inorganic flocculant to the wastewater to make the suspended solid matter set and settle, a step of adding a polymeric flocculant to the wastewater to turn the suspended solid matter to a macrofloc, and an adsorbing step of passing the wastewater through an adsorption layer containing a cation exchanger formed of a leafy vegetable such as mulukhiya and Japanese mustard spinach (see, e.g., PTL 1).

There has also been proposed a flocculating method of flocculating and separating particles in a suspension by means of mixed use or combined use of a flocculant containing at least any one of mulukhiya, a dried product of mulukhiya, and an extract of mulukhiya with a polymeric flocculant (see, e.g., PTL 2).

The more the amount of the wastewater to be purified, the more the amount of an unnecessary substance included in the wastewater, or the more the kinds of unnecessary substances included in the wastewater, the more necessary it is to build an automated system for feeding a purifying agent necessary for the wastewater purification treatments.

Device automation is an important issue for performing high-speed, stable purification treatments, and it is desired to provide a water-purifying agent suitable for being fed to an automated purification apparatus.

CITATION LIST

Patent Literature

PTL 1: Japanese Patent Application Laid-Open (JP-A) No. 2011-194385
PTL 2: JP-A No. 11-114313

SUMMARY OF INVENTION

Technical Problem

However, the method described in PTL 1 takes effort and time because the flocculating step using a flocculant and the adsorbing step using a cation exchanger are separate. The method described in PTL 2 takes time until inorganic ions are reduced to equal to or lower than the desired concentration. Neither of the methods is satisfactory in water purifying performance.

Furthermore, the methods described in these documents are not at all intended for automated devices for wastewater purification treatments. The purifying agents described in the documents are not suitable for being fed to automated system devices.

Hence, it has been desired to provide a water-purifying agent that is capable of reducing inorganic ions to equal to or lower than a desired concentration in a predetermined time, has an excellent water purifying performance, and can be suitably used in an automated system device.

The present invention aims for solving the various problems in the related art and achieving the object described below. That is, the present invention has an object to provide a water-purifying agent that has an excellent water purifying performance and can be suitably used in an automated wastewater purification apparatus.

Solution to Problem

Means for solving the above problems are as follows.
<1> A water-purifying agent, including:
a granulated product including a mixture of a powder of *Corchorus olitorius* and a polymeric flocculant,
wherein a median diameter of the granulated product is 250 micrometers or greater but 850 micrometers or less.
<2> The water-purifying agent according to <1>,
wherein the *Corchorus olitorius* is "intermediate jute No. 4" under nationally identified hemp 2013, which is an identification number in Institute of Bast Fiber Crops, Chinese Academy of Agricultural Sciences.
<3> The water-purifying agent according to <1>,
wherein the *Corchorus olitorius* is "intermediate jute No. 3" under 统品鑑登字第 1209006, which is an identification number in Institute of Bast Fiber Crops, Chinese Academy of Agricultural Sciences.
<4> The water-purifying agent according to <1>,
wherein the *Corchorus olitorius* is "intermediate kenaf" under 皖品鑑登字第 1209001, which is an identification number in Institute of Bast Fiber Crops, Chinese Academy of Agricultural Sciences.
<5> The water-purifying agent according to any one of <1> to <4>,
wherein the polymeric flocculant is a polyacrylamide.
<6> The water-purifying agent according to any one of <1> to <5>,
wherein an amount of moisture in the granulated product is 16% by mass or less.
<7> The water-purifying agent according to any one of <1> to <6>,
wherein a mass composition ratio between the *Corchorus olitorius* and the polymeric flocculant is from 9:1 through 1:9.
<8> The water-purifying agent according to any one of <1> to <7>,
wherein the water-purifying agent is produced by a producing method including a kneading step of mixing the powder of the *Corchorus olitorius* and the polymeric flocculant and kneading the powder of the *Corchorus olitorius* and the polymeric flocculant with addition of moisture, to obtain a kneaded product, a stretching/sheet forming step of shaping the kneaded product into a sheet shape by a stretching method, to obtain a sheet-shaped shaped product, a drying step of drying the sheet-shaped shaped product, to obtain a dried sheet, and a pulverizing step of pulverizing the dried sheet.

<9> A water purification method, including:

dissolving the water-purifying agent according to any one of <1> to <8> in water to obtain a dispersion liquid of the powder of the *Corchorus olitorius* and the polymeric flocculant, and feeding the dispersion liquid to wastewater including an inorganic unnecessary substance to remove the inorganic unnecessary substance in the wastewater.

<10> The water purification method according to <9>,
wherein the wastewater is wastewater including the inorganic unnecessary substance that contains at least any one of nickel, fluorine, iron, copper, zinc, chromium, arsenic, cadmium, tin, and lead.

<11> The water purification method according to <10>, including
feeding the dispersion liquid to the wastewater after subjecting at least any one of inorganic ions selected from the group consisting of a nickel ion, a fluorine ion, an iron ion, a copper ion, a zinc ion, a chromium ion, an arsenic ion, a cadmium ion, a tin ion, and a lead ion contained in the inorganic unnecessary substance to an insolubilizing treatment.

Advantageous Effects of Invention

The present invention can solve the various problems in the related art, achieve the object described above, and provide a water-purifying agent that has an excellent water purifying performance and can be suitably used in an automated wastewater purification apparatus.

BRIEF DESCRIPTION OF DRAWINGS

FIG. 1 is a diagram illustrating identification numbers of "intermediate jute No. 3" and "intermediate kenaf" used in the present invention.

DESCRIPTION OF EMBODIMENTS (Water-Purifying Agent)

A water-purifying agent of the present invention is formed of a granulated product including a mixture of a powder of *Corchorus olitorius* and a polymeric flocculant, The median diameter of the water-purifying agent is 250 micrometers or greater but 850 micrometers or less.

The water-purifying agent of the present invention satisfying the requirement described above is a water-purifying agent that has an excellent water purifying performance and can be suitably used in an automated wastewater purification apparatus.

The present inventors have earnestly studied a water-purifying agent including a plant powder in order to provide a water-purifying agent having an excellent water purifying performance. As a result, it has been found that a granulated product obtained by kneading a powder of *Corchorus olitorius* and a polymeric flocculant has an excellent water purifying performance.

Furthermore, it has been found possible to make *Corchorus olitorius* sufficiently exert its water purifying performance by providing a granulated product using *Corchorus olitorius* with a median diameter in a specific range.

The reason is uncertain but considered as follows.

The target of the present invention is industrial wastewater, e.g., industrial wastewater including an inorganic unnecessary substance such as nickel, fluorine, iron, copper, zinc, chromium, arsenic, cadmium, tin, and lead. For removal of the inorganic unnecessary substance from the wastewater (also described as purification of water), the present invention insolubilizes inorganic ions such as nickel ion, fluorine ion, and iron ion contained in the inorganic unnecessary substance, to form a suspended solid matter (also referred to as microfloc in the present invention), and flocculates and settles the microfloc, to separate the solid from the liquid. In such purification of water, use of a granulated product formed of a powder of *Corchorus olitorius* and a polymeric flocculant is considered to:

(i) promote formation of the microfloc of the inorganic ions included in the wastewater by the polymeric flocculant;

(ii) increase an effect of adsorbing the inorganic ions included in the wastewater by the powder of the *Corchorus olitorius*; and (iii) increase an effect of adsorbing the microfloc by pores present in the powder of the *Corchorus olitorius*.

In this case, the *Corchorus olitorius* cannot exert the adsorbing effect described above if it rapidly absorbs water and settles, whereas the *Corchorus olitorius*, which has a cation exchange function, cannot exert the effects of (ii) and (iii) described above if the void (porous) portions of the fiber of the *Corchorus olitorius* cannot sufficiently have contact with the wastewater.

When the median diameter of the granulated product is less than 250 micrometers, the surface area of the granulated product is small, which cannot make the *Corchorus olitorius* sufficiently exert the adsorbing effect. In the meantime, the *Corchorus olitorius* settles slowly during purification. Therefore, it is possible to provide the granulated product with a relatively large particle diameter. However, when the median diameter of the granulated product is greater than 850 micrometers, the *Corchorus olitorius* becomes faster to settle, failing to exert the adsorbing effect and sufficiently secure the function for removing inorganic ions.

It is considered that a granulated product having a median diameter in a range of 250 micrometers or greater but 850 micrometers or less can take advantage of the characteristic of the *Corchorus olitorius* and exhibit an excellent water purifying performance with a sufficient adsorbing effect.

The granulated product defined in the present invention can be favorably produced by a producing method described below.

The granulated product defined in the present invention has an excellent fluidity and can be suitably used in an automated purification apparatus.

A specific constitution of the water-purifying agent will be described below.

<*Corchorus olitorius*>

It is preferable to use the powder of the *Corchorus olitorius*, because the powder of the *Corchorus olitorius* has a high cation exchange function and has pores that can adsorb a microfloc included in the wastewater including the inorganic ions.

A portion of the *Corchorus olitorius* that is preferable for use is leaf or stalk.

Among *Corchorus olitorius*, *Corchorus olitorius* produced in Changsha City of China, or "intermediate jute No. 4" under nationally identified hemp 2013, which is an identification number in Institute of Bast Fiber Crops, Chinese Academy of Agricultural Sciences, "intermediate jute No. 3" under 皖品鑑登字 No. 1209006, which is an identification number in Institute of Bast Fiber Crops, Chinese Academy of Agricultural Sciences, "intermediate jute No. 1" under XPD005-2005, which is an identification number in Institute of Bast Fiber Crops, Chinese Academy of Agricultural Sciences, or "intermediate kenaf" under 皖品鑑登字 No. 1209001, which is an identification number in Institute of Bast Fiber Crops, Chinese Academy of Agricultural Sciences is preferable for use. "Intermediate jute No. 4", "intermediate jute No. 3", and "intermediate kenaf" are more preferable, and "intermediate jute No. 4" is particularly preferable.

The identification numbers of "intermediate jute No. 3" and "intermediate kenaf" are presented in FIG. 1.

"Intermediate jute No. 4" has the following characteristics.

Kind of agricultural product: jute

Source of breed: a product obtained by breeding a hybridized F1 generation between Hunan jute No. 3 and 0-4(1), with Hunan jute No. 3.

Characteristics: Intermediate jute No. 4 is a typical type of *Corchorus olitorius* jute that has green cylindrical stalks, scattered acicular leaves, green petioles, a small angle from the main stalk, lateral buds and stipules, green calyces, and a cylindrical shape of a long fruit. A 5-locule species is a late-maturing breed.

<Polymeric Flocculant>

The polymeric flocculant is not particularly limited so long as the polymeric flocculant exhibits an effect of removing the inorganic unnecessary substance included in the wastewater, like the *Corchorus olitorius*. Examples of the polymeric flocculant include polyacrylamide (PAM), a salt obtained by partially hydrolyzing polyacrylamide, polyamine, sodium alginate, sodium polyacrylate, and CMC sodium salt. Among these polymeric flocculants, polyacrylamide is preferable for use. As the polyacrylamide, for example, commercially available products FLOPAN AN 905, FLOPAN AN 926, and FLOPAN AN 956 (available from SNF Japan Co., Ltd.) can be used.

<Granulated Product of Mixture of Powder of *Corchorus olitorius* and Polymeric Flocculant>

It is preferable that the mass composition ratio between the powder of the *Corchorus olitorius* and the polymeric flocculant be in a range of from 9:1 through 1:9. In this range, an effect of adsorbing an insolubilized microfloc is sufficiently exerted. The mass ratio is calculated based on dry mass.

The granulated product exhibits the following characteristics.

<<Median Diameter>>

The median diameter of the granulated product defined in the present invention is in a range of 250 micrometers or greater but 850 micrometers or less. A median diameter in a range of 300 micrometers or greater but 800 micrometers or less is preferable, and a median diameter in a range of 400 micrometers or greater but 600 micrometers or less is more preferable.

When the median diameter is 250 micrometers or greater, the powder of the *Corchorus olitorius* can sufficiently exert an adsorbing effect. When the median diameter is 850 micrometers or less, a settling time can be sufficiently secured during purification, and an adsorbing effect can be sufficiently exerted.

Further, when the median diameter is 850 micrometers or less, there is no risk of clogging ducts provided in, for example, a pulverizer or an automatic feeder. Therefore, the granulated product can be favorably used in an automatic purification apparatus.

The median diameter (also referred to as d50) is a diameter of a particle plotted at 50% of all particles when the granulated product is plotted by the size of particle diameter (i.e., a particle diameter that makes particles having larger diameters and particles having smaller diameters equal in quantity). In the present invention, a particle diameter refers to volume particle diameter.

The median diameter can be measured with a commercially available measuring instrument such as MASTERSIZER 2000 (available from Malvern Instruments Ltd.).

<<Amount of Moisture in Granulated Product>>

It is preferable that the amount of moisture in the granulated product defined in the present invention be 16% by mass or less. This is because when the amount of moisture is 16% by mass or less, an effect of adsorbing an insolubilized microfloc is exerted better.

The amount of moisture in the granulated product can be measured with a commercially available moisture meter, and is measured in the manner described below, for example.

The granulated product is weighed out in an amount of $2\pm0.1$ g, and then measured with a moisture meter (available from A&D Company, Limited) at a setting temperature of 105 degrees C. for a heating time of 20 minutes <Method for Producing Granulated Product>

The granulated product defined in the present invention is produced by a producing method including a kneading step of mixing the powder of the *Corchorus olitorius* and the polymeric flocculant and kneading the powder of the *Corchorus olitorius* and the polymeric flocculant with addition of moisture, to obtain a kneaded product, a stretching/sheet forming step of shaping the kneaded product into a sheet shape by a stretching method, to obtain a sheet-shaped shaped product, a drying step of drying the sheet-shaped shaped product, to obtain a dried sheet, and a pulverizing step of pulverizing the dried sheet.

Further, a classifying step of classifying the granulated product by sieving may be provided after the pulverizing step.

The present inventors have experimentally confirmed that an excessively strong shear force (shear) applied to the kneaded product during granulation caused the polymeric flocculant to intrude into the porous portions of the fiber of the *Corchorus olitorius*.

The granulated product has a porous texture in which pores are present and many holes are opened due to the fiber structure of the *Corchorus olitorius*.

Production of the granulated product by the producing method based on the stretching/sheet forming step succeeded in controlling the shear applied to the kneaded product. It was found that the granulated product produced by the stretching/sheet forming step was able to be secured sufficient porous portions of the *Corchorus olitorius* to have contact with the wastewater, and exhibited a good adsorbing effect to an inorganic unnecessary substance.

In the stretching/sheet forming step, the kneaded product is gradually stretched by a roller, and a sheet-shaped shaped product having a predetermined thickness is formed stepwise. According to this method, the shaped product can be produced with the viscosity of the kneaded product maintained favorably. This is also considered to effectively act for the *Corchorus olitorius* to exert its adsorbing effect.

In the kneading step, a dry product of the *Corchorus olitorius* is coarsely pulverized and then finely pulverized, to obtain a powder of the *Corchorus olitorius* having a desired size. Subsequently, the obtained powder of the *Corchorus olitorius* and the polymeric flocculant are mixed and kneaded with addition of moisture.

Here, as the adding amount of water, it is preferable to add water having a mass of about, for example, 3 times as large as the total mass of the mixed powder of the *Corchorus olitorius* and polymeric flocculant.

Kneading is performed with a mixer, for example, a vertical mixer such as a planetary mixer, with the rotation number and time set within predetermined ranges.

The rotation number and time of kneading by the mixer can be appropriately set in consideration of conditions such as the mixing ratio between the powder of the *Corchorus olitorius* and the polymeric flocculant. For example, the rotation number is preferably from 20 rpm through 150 rpm, and the time is preferably from 5 minutes through 25 minutes.

In the stretching/sheet forming step, the obtained kneaded product may be stretched by a stretching method using a roller until the thickness becomes from 4 mm through 20 mm, preferably about 10 mm, to be shaped into a sheet shape.

It is possible to control the shear applied to the kneaded product, by appropriately varying the conditions such as the mixing ratio between the powder of the *Corchorus olitorius* and the polymer, the amount of water to be added, the mixing speed (the rotation number of the mixer during kneading), and the mixing time (the kneading time by the mixer) in the kneading step, or by appropriately varying the stretching conditions in the stretching/sheet forming step.

In the drying step, the obtained shaped product may be dried with a multistage hot air dryer at a temperature of from 80 degrees C. through 150 degrees C. for from 2 hours through 12 hours.

In the pulverizing step, pulverization may be performed with a pulverizer such as a jet type ultrafine grinder until the median diameter falls within a range of from 250 micrometers through 850 micrometers.

In the classifying step, the pulverized powder may be subjected to a classifier, e.g., a vibration sieve machine or a cartridge-type sieve machine, to classify the granulated product of which particle diameter is within a predetermined range, so that the median diameter may be within a range of from 250 micrometers through 850 micrometers.

Further, in the present invention, it is more preferable to proactively classify and remove (cut) granulated products less than 250 micrometers and granulated products greater than 850 micrometers by sieving, and use only granulated products of which particle diameter is within a range of from 250 micrometers through 850 micrometers.

(Water Purification Method)

A water purification method of the present invention dissolves the water-purifying agent of the present invention described above in water to obtain a dispersion liquid of the powder of the *Corchorus olitorius* and the polymeric flocculant, and feeds the dispersion liquid to wastewater to remove an inorganic unnecessary substance included in the wastewater.

Examples of the inorganic unnecessary substance include an inorganic unnecessary substance that contains at least any one of nickel, fluorine, iron, copper, zinc, chromium, arsenic, cadmium, tin, and lead.

The water purification method of the present invention will be specifically described.

Inorganic ions such as nickel ion, fluorine ion, and iron ion contained in the inorganic unnecessary substance included in the wastewater are subjected to an insolubilizing treatment, to form a microfloc. The dispersion liquid prepared as an aqueous solution of from 0.1% through 0.2% is fed to the wastewater. The microfloc is flocculated and settled, and a precipitate separated by settling is removed. In this way, the wastewater is purified.

In the insolubilizing treatment, for example, a base is added to the wastewater to make the wastewater basic and insolubilize the inorganic ions. Further, after the base is added, it is possible to add a polymeric flocculant alone. In this case, addition of a polymeric flocculant alone before addition of the water-purifying agent of the present invention can increase the floc size of the microfloc in the wastewater.

EXAMPLES

The present invention will be described below by way of Examples. The present invention should not be construed as being limited to these Examples.

Example 1

As wastewater used for experiment, an aqueous solution (800 g) including fluorine ion (2,500 mg/L) was prepared by dissolving potassium fluoride in pure water (virtual wastewater).

Next, calcium chloride (8.6 mg/L) was added to the wastewater, and the wastewater was stirred while adding sodium hydroxide to adjust pH to from 7.5 through 9.0, to insolubilize fluorine.

By this operation, the fluorine aqueous solution was separated into a supernatant liquid including a microfloc and a precipitate.

At the time, the fluorine concentration in the supernatant liquid was 10 mg/L.

<Water-Purifying Agent>

Next, a granulated product in which the mass ratio between the *Corchorus olitorius* (produced in Changsha City of China) and the polymeric flocculant (polyamine) was 5:5 was produced by a producing method described below, to obtain a granulated product 1. The granulated product 1 was used as a water-purifying agent 1.

<<Method for Producing Water-Purifying Agent>>

Water was added to the powder of the *Corchorus olitorius* and the polymeric flocculant in a mass that was 3 times as large as the mass of a solid content, which was the total of the powder of the *Corchorus olitorius* and the polymeric flocculant, to obtain a kneaded product (powder of *Corchorus olitorius*+polymeric flocculant+water=30 kg). The kneaded product was put in a planetary mixer (available from Aicohsha Manufacturing Co., Ltd., MIXER ACM-110, with a capacity of 110 L) and kneaded with a shear applied under conditions including a rotation number of 80 rpm and a mixing time of 15 minutes.

Using a press machine (available from Komatsu Industries Corp., a 45 t press machine), the obtained kneaded product was stretched with a roller to produce a sheet-shaped shaped product having a thickness of about 10 mm.

The shaped product was dried with a multistage hot air dryer (available from Shichiyo Co., Ltd., a rack oven) at 120 degrees C. for 3 hours and further at 150 degrees C. for 2 hours.

Next, the dried sheet was pulverized with a jet-type ultrafine grinder (available from Masuko Sangyo Co., Ltd., CEREN MILLER) such that the median diameter would be 400 micrometers.

The median diameter was measured with MASTERSIZER 2000 (available from Malvern Instruments Ltd.).

In this way, the granulated product 1 was obtained and used as the water-purifying agent 1.

The amount of moisture in the granulated product 1 obtained in the manner described above was measured by the method described above. As a result, it was 10% by mass.

Next, the water-purifying agent 1 obtained above was dissolved in water, to produce a dispersion liquid, which was a 0.1% by mass aqueous solution. This dispersion liquid was dropped at a rate of 3 mL/minute into the wastewater formed of: the supernatant liquid including the microfloc; and the precipitate under stirring. At the time, the water-purifying agent was added in an amount of 5 mg/L relative to a solid content in the wastewater. As the method for measuring the "solid content", the solid content can be obtained by back calculation from a slurry concentration in the wastewater measured with a moisture meter.

After dropping, stirring was maintained for 1 minute, and a fluorine ion concentration was measured every 1 minute after stirring was stopped, to measure the time taken until the fluorine ion concentration became 4 mg/L or lower.

The ion concentration was measured with LAMBDA (Λ) 9000 (available from Kyoritsu Chemical-Check Lab, Corp.).

As the measurement result, 6 hours or shorter is an acceptable level for practical use. A shorter time taken indicates a better result.

The evaluation result of Example 1 is presented in Table 1-1. In Table 1-1, PAM represents a polyacrylamide (the same applies in Table 1-2 to Table 1-6).

Example 2

A granulated product 2 was produced in the same manner as in Example 1, except that unlike in Example 1, the pulverized powder was subjected to a classifier (a vibration sieve machine available from Dalton Corporation) to remove (cut) particles having a particle diameter of less than 200 micrometers by sieving.

Using a water-purifying agent 2 formed of the granulated product 2, the characteristic of the water-purifying agent was evaluated in the same manner as in Example 1. The evaluation result of Example 2 is presented in Table 1-1.

Example 3

A granulated product 3 was produced in the same manner as in Example 1, except that unlike in Example 1, the pulverized powder was subjected to a classifier (a vibration sieve machine available from Dalton Corporation) to remove (cut) particles having a particle diameter of greater than 850 micrometers by sieving.

Using a water-purifying agent 3 formed of the granulated product 3, the characteristic of the water-purifying agent was evaluated in the same manner as in Example 1. The evaluation result of Example 3 is presented in Table 1-1.

Example 4

A granulated product 4 was produced in the same manner as in Example 1, except that unlike in Example 1, the pulverized product was subjected to a classifier (a vibration sieve machine available from Dalton Corporation) to remove (cut) particles having a particle diameter of less than 250 micrometers and greater than 850 micrometers by sieving, to use only particles having a particle diameter in a range of 250 micrometers or greater but 850 micrometers or less.

Using a water-purifying water 4 formed of the granulated product 4, the characteristic of the water-purifying agent was evaluated in the same manner as in Example 1. The evaluation result of Example 4 is presented in Table 1-1.

Example 5

A granulated product 5 was produced in the same manner as in Example 4, except that unlike in Example 4, a polyacrylamide (PAM) was used as the polymeric flocculant.

Using a water-purifying agent 5 formed of the granulated product 5, the characteristic of the water-purifying agent was evaluated in the same manner as in Example 1. The evaluation result of Example 5 is presented in Table 1-1.

Example 6

A granulated product 6 was produced in the same manner as in Example 5, except that unlike in Example 5, "intermediate jute No. 4" was used as the *Corchorus olitorius*.

Using a water-purifying agent 6 formed of the granulated product 6, the characteristic of the water-purifying agent was evaluated in the same manner as in Example 1. The evaluation result of Example 6 is presented in Table 1-2.

Example 7

A granulated product 7 was produced in the same manner as in Example 6, except that unlike in Example 6, the granulated product was stored under wet-heat conditions to adjust the amount of moisture in the granulated product to 16% by mass.

Using a water-purifying agent 7 formed of the granulated product 7, the characteristic of the water-purifying agent was evaluated in the same manner as in Example 1. The evaluation result of Example 7 is presented in Table 1-2.

Example 8

A granulated product 8 was produced in the same manner as in Example 6, except that unlike in Example 6, the granulated product was stored under wet-heat conditions to adjust the amount of moisture in the granulated product to 20% by mass.

Using a water-purifying agent 8 formed of the granulated product 8, the characteristic of the water-purifying agent was evaluated in the same manner as in Example 1. The evaluation result of Example 8 is presented in Table 2-2.

Example 9

A granulated product 9 was produced in the same manner as in Example 6, except that unlike in Example 6, the granulated product was stored under wet-heat conditions to adjust the amount of moisture in the granulated product to 5% by mass.

Using a water-purifying agent 9 formed of the granulated product 9, the characteristic of the water-purifying agent was evaluated in the same manner as in Example 1. The evaluation result of Example 9 is presented in Table 2-2.

Example 10

A granulated product 10 was produced in the same manner as in Example 6, except that unlike in Example 6, the mass ratio between the "intermediate jute No. 4" and the polymeric flocculant was changed to 90:10.

Using a water-purifying agent 10 formed of the granulated product 10, the characteristic of the water-purifying agent was evaluated in the same manner as in Example 1. The evaluation result of Example 10 is presented in Table 1-2.

Example 11

A granulated product 11 was produced in the same manner as in Example 6, except that unlike in Example 6, the mass ratio between the "intermediate jute No. 4" and the polymeric flocculant was changed to 70:30.

Using a water-purifying agent 11 formed of the granulated product 11, the characteristic of the water-purifying agent was evaluated in the same manner as in Example 1. The evaluation result of Example 11 is presented in Table 1-3.

Example 12

A granulated product 12 was produced in the same manner a sin Example 6, except that unlike in Example 6, the mass ratio between the "intermediate jute No. 4" and the polymeric flocculant was changed to 30:70.

Using a water-purifying agent 12 formed of the granulated product 12, the characteristic of the water-purifying agent was evaluated in the same manner as in Example 1. The evaluation result of Example 12 is presented in Table 1-3.

Example 13

A granulated product 13 was produced in the same manner as in Example 6, except that unlike in Example 6, the mass ratio between the "intermediate jute No. 4" and the polymeric flocculant was changed to 10:90.

Using a water-purifying agent 13 formed of the granulated product 13, the characteristic of the water-purifying agent was evaluated in the same manner as in Example 1. The evaluation result of Example 13 is presented in Table 1-3.

Example 14

A granulated product 14 was produced in the same manner as in Example 6, except that unlike in Example 6, the adding amount of the "intermediate jute No. 4" was changed to 2 mg/L relative to the solid content in the wastewater including the microfloc.

Using a water-purifying agent 14 formed of the granulated product 14, the characteristic of the water-purifying agent was evaluated in the same manner as in Example 1. The evaluation result of Example 14 is presented in Table 1-3.

Example 15

A granulated product 15 was produced in the same manner as in Example 6, except that unlike in Example 6, the adding amount of the "intermediate jute No. 4" was changed to 1 mg/L relative to the solid content in the wastewater including the microfloc.

Using a water-purifying agent 15 formed of the granulated product 15, the characteristic of the water-purifying agent was evaluated in the same manner as in Example 1. The evaluation result of Example 15 is presented in Table 1-3.

Example 16

As wastewater used for experiment, an aqueous solution (800 g) including nickel ion (50 mg/L) was prepared by dissolving nickel sulfate hexahydrate in pure water (virtual wastewater).

Next, the wastewater was stirred while adding sodium hydroxide to adjust pH to from 8.5 through 10.0, to insolubilize nickel.

At the time, the ion concentration in the supernatant liquid of the wastewater was 2 mg/L.

As the "time taken", a time taken until the ion concentration became 1 mg/L or lower was measured.

Using the water-purifying agent 6 formed of the granulated product 6, the characteristic of the water-purifying agent was evaluated by performing the same operation as in Example 6 except the above described. The evaluation result of Example 16 is presented in Table 1-4.

Example 17

As wastewater used for experiment, an aqueous solution (800 g) including iron ion (200 mg/L) was prepared by dissolving ferric chloride hexahydrate in pure water (virtual wastewater).

Next, the wastewater was stirred while adding sodium hydroxide to adjust pH to from 6.5 through 9.0, to insolubilize iron.

At the time, the ion concentration in the supernatant liquid of the wastewater was 2 mg/L.

As the "time taken", a time taken until the ion concentration became 1 mg/L or lower was measured.

Using the water-purifying agent 6 formed of the granulated product 6, the characteristic of the water-purifying agent was evaluated by performing the same operation as in Example 6 except the above described. The evaluation result of Example 17 is presented in Table 1-4.

Example 18

As wastewater used for experiment, an aqueous solution (800 g) including copper ion (100 mg/L) was prepared by dissolving copper sulfate pentahydrate in pure water (virtual wastewater).

Next, the wastewater was stirred while adding sodium hydroxide to adjust pH to from 7.0 through 8.0, to insolubilize copper.

At the time, the ion concentration in the supernatant liquid of the wastewater was 2 mg/L.

As the "time taken", a time taken until the ion concentration became 1 mg/L or lower was measured.

Using the water-purifying agent 6 formed of the granulated product 6, the characteristic of the water-purifying agent was evaluated by performing the same operation as in Example 6 except the above described. The evaluation result of Example 18 is presented in Table 1-4.

Example 19

As wastewater used for experiment, an aqueous solution (800 g) including zinc ion (100 mg/L) was prepared by dissolving zinc nitrate hexahydrate in pure water (virtual wastewater).

Next, the wastewater was stirred while adding sodium hydroxide to adjust pH to from 9.0 through 9.5, to insolubilize zinc.

At the time, the ion concentration in the supernatant liquid of the wastewater was 5 mg/L.

As the "time taken", a time taken until the ion concentration became 3 mg/L or lower was measured.

Using the water-purifying agent 6 formed of the granulated product 6, the characteristic of the water-purifying agent was evaluated by performing the same operation as in Example 6 except the above described. The evaluation result of Example 19 is presented in Table 1-4.

Example 20

As wastewater used for experiment, an aqueous solution (800 g) including chromium ion (100 mg/L) was prepared by dissolving potassium dichromate in pure water (virtual wastewater).

Next, the wastewater was stirred while adding sodium hydroxide to adjust pH to from 6.0 through 7.5, to insolubilize chromium.

At the time, the ion concentration in the supernatant liquid of the wastewater was 5 mg/L.

As the "time taken", a time taken until the ion concentration became 3 mg/L or lower was measured.

Using the water-purifying agent 6 formed of the granulated product 6, the characteristic of the water-purifying agent was evaluated by performing the same operation as in Example 6 except the above described. The evaluation result of Example 20 is presented in Table 1-4.

Example 21

As wastewater used for experiment, an aqueous solution (800 g) including arsenic ion (10 mg/L) was prepared by dissolving diarsenic trioxide in pure water (virtual wastewater).

Next, ferric chloride (65 mg/L) and calcium chloride (354 mg/L) were added to the wastewater, and then the wastewater was stirred while adding sodium hydroxide to adjust pH to from 8.0 through 9.5, to insolubilize arsenic.

At the time, the ion concentration in the supernatant liquid of the wastewater was 0.05 mg/L.

As the "time taken", a time taken until the ion concentration became 0.01 mg/L or lower was measured.

Using the water-purifying agent 6 formed of the granulated product 6, the characteristic of the water-purifying agent was evaluated by performing the same operation as in Example 6 except the above described. The evaluation result of Example 21 is presented in Table 1-5.

Example 22

A granulated product 22 was produced in the same manner as in Example 5, except that unlike in Example 5, "intermediate jute No. 1" was used as the *Corchorus olitorius*.

Using a water-purifying agent 22 formed of the granulated product 22, the characteristic of the water-purifying agent was evaluated in the same manner as in Example 1. The evaluation result of Example 22 is presented in Table 1-5.

Example 23

A granulated product 23 was produced in the same manner as in Example 5, except that unlike in Example 5, "intermediate jute No. 3" was used as the *Corchorus olitorius*.

Using a water-purifying agent 23 formed of the granulated product 23, the characteristic of the water-purifying agent was evaluated in the same manner as in Example 1. The evaluation result of Example 23 is presented in Table 1-5.

Example 24

A granulated product 24 was produced in the same manner as in Example 5, except that unlike in Example 5, "intermediate kenaf" was used as the *Corchorus olitorius*.

Using a water-purifying agent 24 formed of the granulated product 24, the characteristic of the water-purifying agent was evaluated in the same manner as in Example 1. The evaluation result of Example 24 is presented in Table 1-5.

Example 25

An experiment was conducted in the same manner as in Example 6, except that unlike in Example 6, during pulverization of the sheet, pulverization was performed to obtain a median diameter of 300 micrometers, and the pulverized product obtained from the pulverization was used as is as a granulated product 25 without classification by sieving.

The granulated product 25 used in Example 25 was not subjected to a classifying step after pulverization and was not cut by sieving, neither was the granulated product 1 of Example 1.

Using a water-purifying agent 25 formed of the granulated product 25, the characteristic of the water-purifying agent was evaluated in the same manner as in Example 1. The evaluation result of Example 25 is presented in Table 1-5.

Example 26

An experiment was conducted in the same manner as in Example 25, except that unlike in Example 25, during pulverization of the sheet, pulverization was performed to obtain a median diameter of 800 micrometers, to produce a granulated product 26.

Using a water-purifying agent 26 formed of the granulated product 26, the characteristic of the water-purifying agent was evaluated in the same manner as in Example 1. The evaluation result of Example 26 is presented in Table 1-5.

Comparative Example 1

An experiment was conducted in the same manner as in Example 6, except that unlike in Example 6, a granulated product was not used and only the polymeric flocculant was used. The adding amount of the polymeric flocculant in Comparative Example 1 was 5 mg/L, and the amount of moisture in the polymeric flocculant was 10% by mass.

Using a comparative water-purifying agent 1 of Comparative Example 1, the water purifying characteristic was evaluated in the same manner as in Example 1. The evaluation result of Comparative Example 1 is presented in Table 1-6.

Comparative Example 2

An experiment was conducted in the same manner as in Example 6, except that unlike in Example 6, a granulated product was not used, and the powder of the *Corchorus*

*olitorius* and the polymeric flocculant were used alone respectively. The total adding amount of the *Corchorus olitorius* and the polymeric flocculant in Comparative Example 2 was 5 mg/L, and the amount of moisture in the mixture of the *Corchorus olitorius* and the polymeric flocculant was 10% by mass.

Using a comparative water-purifying agent 2 of Comparative Example 2, the characteristic of the water-purifying agent was evaluated in the same manner as in Example 1. The evaluation result of Comparative Example 2 is presented in Table 1-6.

Comparative Example 3

An experiment was conducted in the same manner as in Example 6, except that unlike in Example 6, the insolubilizing treatment was not performed.

The characteristic of the water-purifying agent of Comparative Example 3 was evaluated in the same manner as in Example 1. The evaluation result of Comparative Example 3 is presented in Table 1-6.

Comparative Example 4

An experiment was conducted in the same manner as in Example 25, except that unlike in Example 25, during pulverization of the sheet, pulverization was performed to obtain a median diameter of 200 micrometers, to produce a comparative granulated product 4.

Using a comparative water-purifying agent 4 formed of the comparative granulated product 4, the characteristic of the water-purifying agent was evaluated in the same manner as in Example 1. The evaluation result of Comparative Example 4 is presented in Table 1-6.

Comparative Example 5

An experiment was conducted in the same manner as in Example 25, except that unlike in Example 25, during pulverization of the sheet, pulverization was performed to obtain a median diameter of 900 micrometers, to produce a comparative granulated product 5.

Using a comparative water-purifying agent 5 formed of the comparative granulated product 5, the characteristic of the water-purifying agent was evaluated in the same manner as in Example 1. The evaluation result of Comparative Example 5 is presented in Table 1-6.

Comparative Example 5 was problematic in repeatability. There was a case where a measurement result was obtained, and there was a case when measurement was impossible because an automatic supplying feeder was clogged to become incapable of performing automatic feeding. Hence, the result obtained when the automatic supplying feeder was not clogged to succeed in conducting the experiment until the very end and performing the measurement is presented in Table 1-6.

TABLE 1-1

|  | Ex. 1 | Ex. 2 | Ex. 3 | Ex. 4 | Ex. 5 |
| --- | --- | --- | --- | --- | --- |
| Target ion | F | F | F | F | F |
| *Corchorus olitorius* | *Corchorus olitorius* | *Corchorus olitorius* | *Corchorus olitorius* | *Corchorus olitorius* | *Corchorus olitorius* |
| Median diameter (micrometer) of granulated product and classifying method | 400 micrometers (without cutting of particle less than 250 micrometers and greater than 850 micrometers) | 400 micrometers (particles less than 250 micrometers were cut) | 400 micrometers (particles greater than 850 micrometers were cut) | 400 micrometers (particle less than 250 micrometers and greater than 850 micrometers were cut) | Same as in Ex. 4 |
| Adding amount (mg/L) | 5 | 5 | 5 | 5 | 5 |
| Polymeric flocculant | Polyamine | Polyamine | Polyamine | Polyamine | PAM |
| Jute:flocculant ratio | 5:5 | 5:5 | 5:5 | 5:5 | 5:5 |
| Amount of moisture (% by mass) | 10 | 10 | 10 | 10 | 10 |
| Time taken (Hr) | 6 | 5.5 | 5.5 | 5 | 4.5 |

TABLE 1-2

|  | Ex. 6 | Ex. 7 | Ex. 8 | Ex. 9 | Ex. 10 |
| --- | --- | --- | --- | --- | --- |
| Target ion | F | F | F | F | F |
| *Corchorus olitorius* | Intermediate jute No. 4 | Intermediate jute No. 4 | Intermediate jute No. 4 | Intermediate jute No. 4 | Intermediate jute No. 4 |
| Median diameter (micrometer) of granulated product and classifying method | Same as in Ex. 4 | Same as in Ex. 4 | Same as in Ex. 4 | Same as in Ex. 4 | Same as in Ex. 4 |
| Adding amount (mg/L) | 5 | 5 | 5 | 5 | 5 |
| Polymeric flocculant | PAM | PAM | PAM | PAM | PAM |
| Jute:flocculant ratio | 5:5 | 5:5 | 5:5 | 5:5 | 9:1 |

TABLE 1-2-continued

|  | Ex. 6 | Ex. 7 | Ex. 8 | Ex. 9 | Ex. 10 |
|---|---|---|---|---|---|
| Amount of moisture (% by mass) | 10 | 16 | 20 | 5 | 10 |
| Time taken (Hr) | 4 | 4.2 | 5 | 4 | 5 |

TABLE 1-3

|  | Ex. 11 | Ex. 12 | Ex. 13 | Ex. 14 | Ex. 15 |
|---|---|---|---|---|---|
| Target ion | F | F | F | F | F |
| *Corchorus olitorius* | Intermediate jute No. 4 | Intermediate jute No. 4 | Intermediate jute No. 4 | Intermediate jute No. 4 | Intermediate jute No. 4 |
| Median diameter (micrometer) of granulated product and classifying method | Same as in Ex. 4 | Same as in Ex. 4 | Same as in Ex. 4 | Same as in Ex. 4 | Same as in Ex. 4 |
| Adding amount (mg/L) | 5 | 5 | 5 | 2 | 1 |
| Polymeric flocculant | PAM | PAM | PAM | PAM | PAM |
| Jute:flocculant ratio | 7:3 | 3:7 | 1:9 | 5:5 | 5:5 |
| Amount of moisture (% by mass) | 10 | 10 | 10 | 10 | 10 |
| Time taken (Hr) | 4 | 4 | 5 | 5 | 6 |

TABLE 1-4

|  | Ex. 16 | Ex. 17 | Ex. 18 | Ex. 19 | Ex. 20 |
|---|---|---|---|---|---|
| Target ion | Ni | Fe | Cu | Zn | Cr |
| *Corchorus olitorius* | Intermediate jute No. 4 | Intermediate jute No. 4 | Intermediate jute No. 4 | Intermediate jute No. 4 | Intermediate jute No. 4 |
| Median diameter (micrometer) of granulated product and classifying method | Same as in Ex. 4 | Same as in Ex. 4 | Same as in Ex. 4 | Same as in Ex. 4 | Same as in Ex. 4 |
| Adding amount (mg/L) | 5 | 5 | 5 | 5 | 5 |
| Polymeric flocculant | PAM | PAM | PAM | PAM | PAM |
| Jute:flocculant ratio | 5:5 | 5:5 | 5:5 | 5:5 | 5:5 |
| Amount of moisture (% by mass) | 10 | 10 | 10 | 10 | 10 |
| Time taken (Hr) | 4 | 4 | 4 | 4 | 4 |

TABLE 1-5

|  | Ex. 21 | Ex. 22 | Ex. 23 | Ex. 24 | Ex. 25 | Ex. 26 |
|---|---|---|---|---|---|---|
| Target ion | As | F | F | F | F | F |
| *Corchorus olitorius* | Intermediate jute No. 4 | Intermediate jute No. 1 | Intermediate jute No. 3 | Intermediate kenaf | Intermediate jute No. 4 | Intermediate jute No. 4 |
| Median diameter (micrometer) of granulated product and classifying method | Same as in Ex. 4 | Same as in Ex. 4 | Same as in Ex. 4 | Same as in Ex. 4 | 300 micrometers (without cutting by sieving) | 800 micrometers (without cutting by sieving) |
| Adding amount (mg/L) | 5 | 5 | 5 | 5 | 5 | 5 |
| Polymeric flocculant | PAM | PAM | PAM | PAM | PAM | PAM |

TABLE 1-5-continued

|  | Ex. 21 | Ex. 22 | Ex. 23 | Ex. 24 | Ex. 25 | Ex. 26 |
|---|---|---|---|---|---|---|
| Jute:flocculant ratio | 5:5 | 5:5 | 5:5 | 5:5 | 5:5 | 5:5 |
| Amount of moisture (% by mass) | 10 | 10 | 10 | 10 | 10 | 10 |
| Time taken (Hr) | 4 | 6 | 5.5 | 4.5 | 5.8 | 5.5 |

TABLE 1-6

|  | Comp. Ex. 1 | Comp. Ex. 2 | Comp. Ex. 3 | Comp. Ex. 4 | Comp. Ex. 5 |
|---|---|---|---|---|---|
| Target ion | F | F | F | F | F |
| *Corchorus olitorius* | — | Intermediate jute No. 4 | Intermediate jute No. 4 | Intermediate jute No. 4 | Intermediate jute No. 4 |
| Median diameter (micrometer) of granulated product and classifying method | — | — | Same as in Ex. 4 | 200 micrometers (without cutting by sieving) | 900 micrometers (without cutting by sieving) |
| Adding amount (mg/L) | 5 | 5 | 5 | 5 | 5 |
| Polymeric flocculant | PAM | PAM | PAM | PAM | PAM |
| Jute:flocculant ratio | — | 5:5 | 5:5 | 5:5 | 5:5 |
| Amount of moisture (% by mass) | 10 | 10 | 10 | 10 | 10 |
| Time taken (Hr) | 12 | 7 | 9 | 7.5 | 6.2 (problematic in repeatability with automated apparatus) |

From the results of Examples 1 to 26, it was confirmed that the water-purifying agent of the present invention was a water-purifying agent that was able to lower an inorganic ion concentration to equal to or lower than a desired concentration in a short time, and was excellent in water purifying performance. Furthermore, the water-purifying agent of the present invention was a water-purifying agent that had a good fluidity, would not clog an automatic feeder and a quantitative machine, and could be suitably used in an automated system device.

The invention claimed is:

1. A water purification method, comprising:
feeding a dispersion liquid of a granulated product that comprises a powder of *Corchorus olitorius* and a polymeric flocculant to wastewater including an inorganic unnecessary substance to remove the inorganic unnecessary substance in the wastewater,
wherein the wastewater is wastewater including the inorganic unnecessary substance that contains at least any one of nickel, fluorine, iron, copper, zinc, chromium, arsenic, cadmium, tin, and lead, and further comprising the step of:
subjecting at least any one of inorganic ions selected from the group consisting of a nickel ion, a fluorine ion, an iron ion, a copper ion, a zinc ion, a chromium ion, an arsenic ion, a cadmium ion, a tin ion, and a lead ion contained in the inorganic unnecessary substance to an insolubilizing treatment, wherein the step of feeding the dispersion liquid to the wastewater is done after the step of subjecting the at least any one of inorganic ions to the insolubilizing treatment;
wherein a particle diameter of the granulated product is within a range of from 250 micrometers through 850 micrometers, and wherein the granulated product is classified to remove granulated product having a particle diameter less than 250 micrometers and greater than 850 micrometers; and
wherein an adding amount of the dispersion liquid is 2 mg/L or more relative to a solid content in the wastewater.

2. The water purification method according to claim 1, wherein the polymeric flocculant is a polyacrylamide.

3. The water purification method according to claim 1, wherein a mass composition ratio between the *Corchorus olitorius* and the polymeric flocculant is from 9:1 through 1:9.

4. The water purification method according to claim 1, wherein an amount of moisture in the granulated product is 16% by mass or less.

5. The water purification method according to claim 1, wherein the adding amount of the dispersion liquid is 2 mg/L or more but 5 mg/L or less relative to a solid content in the wastewater.

* * * * *